(12) United States Patent
Yamada

(10) Patent No.: US 6,327,439 B1
(45) Date of Patent: Dec. 4, 2001

(54) METHOD AND APPARATUS FOR MANUFACTURING POSTCARD-AFFIXED PHOTOGRAPHIC PRINTS AND PHOTOGRAPHIC PRINTS

(75) Inventor: Naoto Yamada, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/174,572

(22) Filed: Oct. 19, 1998

(30) Foreign Application Priority Data

Oct. 17, 1997 (JP) .................................................. 9-285144
Oct. 17, 1997 (JP) .................................................. 9-285145
Sep. 30, 1998 (JP) ................................................. 10-278672

(51) Int. Cl.$^7$ .............................. G03D 3/08; G03B 17/48
(52) U.S. Cl. ........................... 396/429; 396/613; 156/64; 156/269; 355/46
(58) Field of Search ............................ 156/269, 64, 249, 156/277, 324, 361, 387, 510, 516, 555; 396/322, 335, 336, 337, 338, 339, 429, 612, 613; 355/46

(56) References Cited

U.S. PATENT DOCUMENTS

| | | | |
|---|---|---|---|
| 2,058,415 | * | 10/1936 | Chretien ................................... 355/46 |
| 4,083,635 | * | 4/1978 | Reed, Jr. .................................. 355/77 |
| 4,994,827 | * | 2/1991 | Jamzadeh et al. ..................... 346/157 |
| 5,114,291 | * | 5/1992 | Hefty ......................................... 412/8 |
| 5,403,428 | * | 4/1995 | Shingo et al. ....................... 156/442.1 |
| 5,647,938 | * | 7/1997 | Levine ................................... 156/269 |

* cited by examiner

*Primary Examiner*—David M. Gray
(74) *Attorney, Agent, or Firm*—Sughrue, Mion, Zinn, Macpeak & Seas, PLLC

(57) ABSTRACT

The present invention is to provide a method and apparatus for manufacturing a postcard-affixed photographic print and a photographic print, which can improve productivity while using a conventional digital image recording device, and which improve the efficiency of processing a roll of photographic printing paper without greatly altering a conventional manufacturing line by that images are printed such that a plurality of image rows, each having a plurality of images which are formed along the transverse direction of an elongated photographic printing paper on the photographic printing paper.

27 Claims, 9 Drawing Sheets

F I G. 1
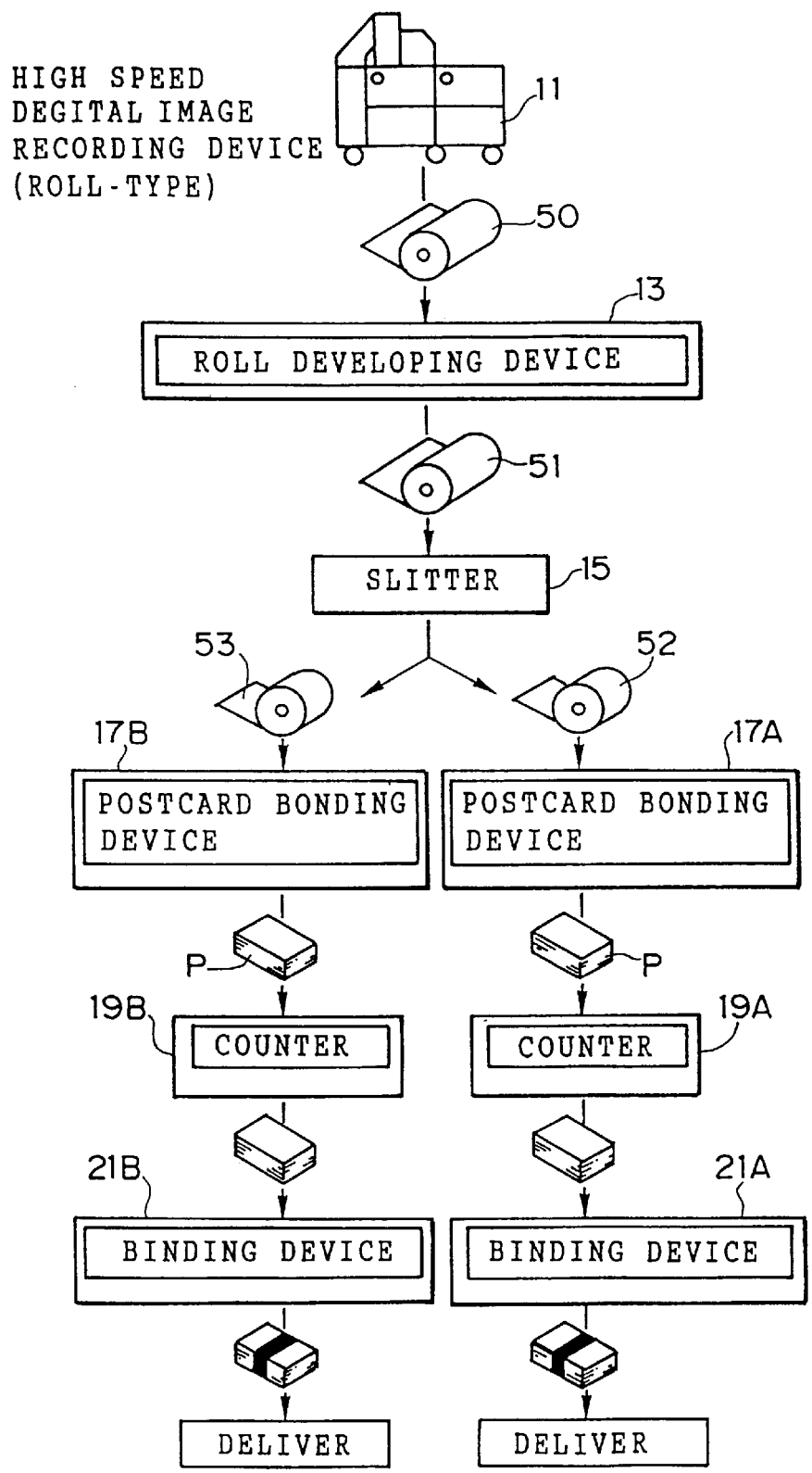

F I G. 4 A
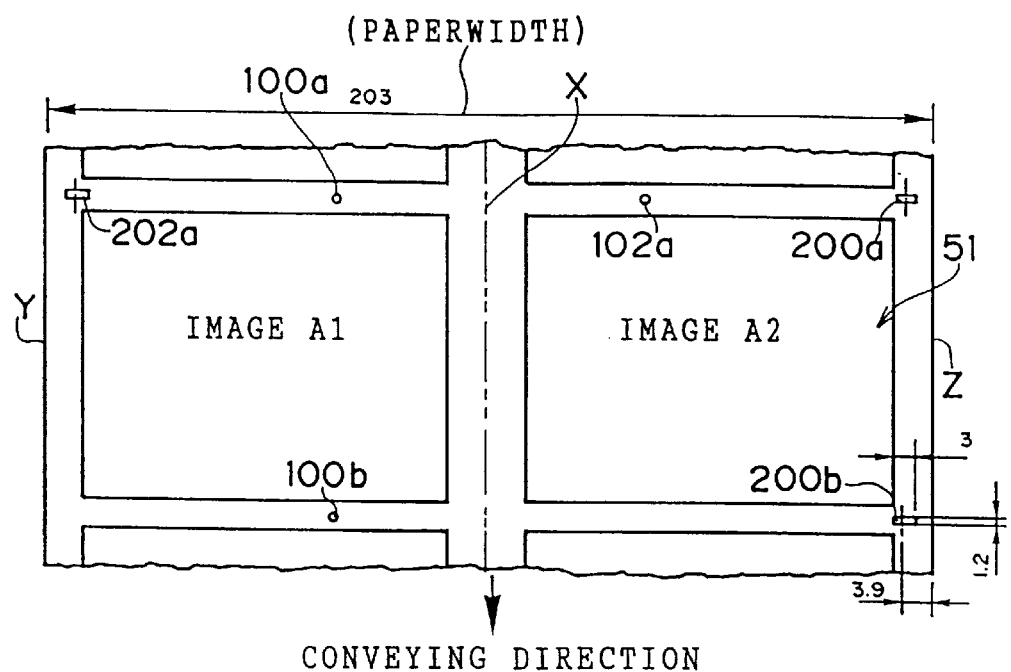
F I G. 4 B
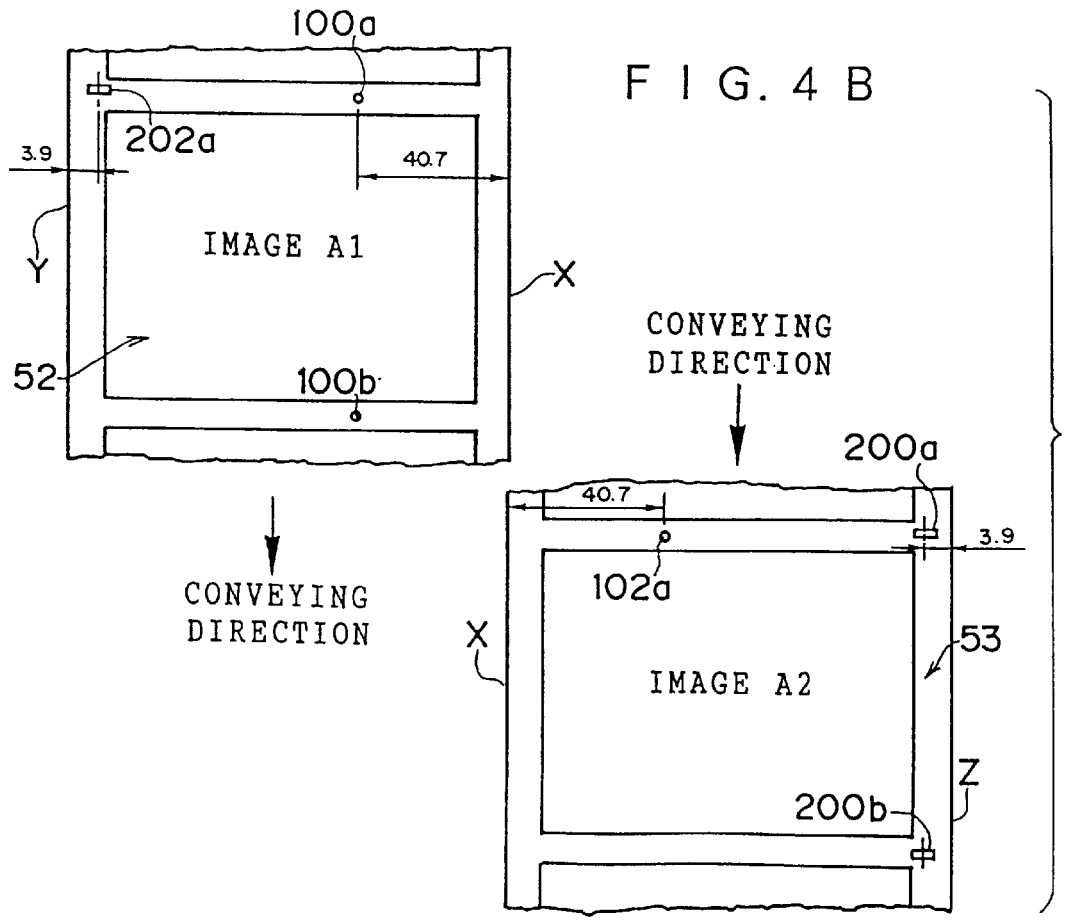

METHOD AND APPARATUS FOR MANUFACTURING POSTCARD-AFFIXED PHOTOGRAPHIC PRINTS AND PHOTOGRAPHIC PRINTS

BACKGROUND OF THE INVENTION

1. Field of the Invention

The present invention relates to a method and apparatus for manufacturing a postcard-affixed photographic print wherein a postcard is bonded to the back of a photographic print and to a method and apparatus for manufacturing a photographic print.

2. Description of the Related Art

Postcard-affixed photographic prints wherein a postcard is bonded to the back of a photographic print have conventionally been known. Postcard-affixed photographic prints of this kind are obtained by printing a row of plural images along the longitudinal direction of a thin, rolled photographic printing paper having a predetermined width, for example, a width of 102 mm, by a digital image recording device which reads the images from a film, developing the printed images by a roll developing apparatus, and cutting the photographic printing paper per image and into postcard sizes after affixing postcards to the rear surface by a postcard bonding apparatus.

The conventional digital image recording device comprises a first punch and a second punch. The first punch punches holes for demarcating the printing positions of the respective images and holes for demarcating the printing positions of the respective orders in the photographic printing paper before printing, along the conveying direction of the photographic printing paper. The second punch has an adjustable punching position, and punches holes for indicating demarcation of the respective images and holes for indicating demarcation of the respective orders in the photographic printing paper after printing, along the conveying direction of the photographic printing paper.

The number of products using photographic prints such as postcard-affixed photographic prints of this kind has been increasing recently. Thus, improvement in the efficiency of the series of the processings of the postcard-affixed photographic prints, i.e., the printing of the images, the developing of the photographic printing paper, the cutting of a printed photographic paper into postcard size, etc. has come to be required. In other words, improvement in productivity is required. An improvement in productivity is especially required in the manufacturing of postcard-affixed photographic prints wherein a single image may have to be printed many times. Also, improvement in the efficiency of the printing process is required.

However, the efficiency of printing process depends on an efficiency of printer. Namely, in the manufacturing of postcard-affixed photographic prints wherein a single image must be printed many times, the productivity is determined by the throughput of a printer after the data of the images to be printed is input.

SUMMARY OF THE INVENTION

The present invention was made to solve the above problems, and an object of the present invention is to provide a method and apparatus for manufacturing a postcard-affixed photographic print, which can improve productivity while using a conventional digital image recording device, and which improve the efficiency of processing a roll of photographic printing paper without greatly altering a conventional manufacturing line.

Also, another object of the present invention is to provide a method and apparatus for manufacturing a photographic print, which can improve productivity while using a conventional digital image recording device, and which improve the efficiency of processing a roll of photographic printing paper without greatly altering a conventional manufacturing line.

In order to achieve the above objects, a first aspect of the present invention is a method of manufacturing a postcard-affixed photographic print for manufacturing a postcard-affixed photographic print in which a postcard is bonded to the back of the photographic print comprising an image printing step in which images are printed such that a plurality of image rows, each having a plurality of images which are formed along the longitudinal direction of an elongated photographic printing paper, are formed in the transverse direction of the photographic printing paper on the photographic printing paper.

A second aspect of the present invention is a method of manufacturing a postcard-affixed photographic print according to the first aspect of the present invention further comprising a print forming step in which the photographic printing paper on which the images are printed is developed so as to form a plural-row printed photographic paper on which a plurality of image rows are formed, a bonding step in which a reverse surface of each image formed portion of the plural-row printed photographic paper and a reverse surface of a postcard are bonded together after having been superposed together, and a cutting step of cutting the plural-row printed photographic paper along the sides of each postcard after the bonding step has been completed.

A third aspect of the present invention is a method of manufacturing a postcard-affixed photographic print according to the first aspect of the present invention further comprising a print forming step in which the photographic printing paper on which the images are printed is developed so as to form a plural-row printed photographic paper on which a plurality of image rows are formed, a separating step in which the plural-row printed photographic paper is separated into a single-row printed photographic papers on each of which an image row is formed, by cutting the plural-row printed photographic paper at a region between the image rows formed thereon, a bonding step in which a reverse surface of each image formed portion of the single-row printed photographic papers and a reverse surface of a postcard are bonded together after having been superposed together, and a cutting step of cutting the single-row printed photographic papers along the sides of each postcard after the bonding step has been completed, wherein the bonding step is conducted by at least one bonding apparatus for carrying out bonding.

A fourth aspect of the present invention is a method of manufacturing a postcard-affixed photographic print according to the first aspect of the present invention further comprising a first punching step in which, before images are printed, a first punch, which is provided to punch in the photographic printing paper and along a conveying direction of the photographic printing paper, image printing position demarcating holes which each demarcate a printing position of one image and order printing position demarcating holes which each demarcate a printing position of one order, punches in the photographic printing paper the image printing position demarcating holes and the order printing position demarcating holes, and a second punching step in which, after the images are printed, a second punch, which is provided to punch in the photographic printing paper and along the conveying direction of the photographic printing paper, image demarcation indicating holes which each indicate demarcation of one image and order demarcation indicating holes which each indicate demarcation of one order, punches the image demarcation indicating holes and the order demarcation indicating holes in the photographic printing paper, wherein, in the printing step, for each image printing position demarcating hole, printing of plural images which are aligned in a transverse direction of the photographic printing paper is repeated along the longitudinal direction of the photographic printing paper, and for each order printing position demarcating hole, printing of images of a different order commences, and the second punch whose hole punching position is adjustable is adjusted such that holes are punched at positions corresponding to positions indicating demarcation of images and at positions corresponding to positions indicating demarcation of orders in each row of the plural-image rows due to a suitable combination of the holes punched by the first punch and the holes punched by the second punch.

A fifth aspect of the present invention is a postcard-affixed photographic print manufacturing apparatus for manufacturing a postcard-affixed photographic print in which a postcard is bonded to the back of the photographic print comprising printing means for printing images in such a way that a plurality of image rows, each having a plurality of images which are formed along the longitudinal direction of an elongated photographic printing paper, are formed in the transverse direction of the photographic printing paper on the photographic printing paper.

A sixth aspect of the present invention is a postcard-affixed photographic print manufacturing apparatus according to the fifth aspect of the present invention comprising a print forming means for forming a plural-row printed photographic paper on which a plurality of image rows are formed, by developing the photographic printing paper on which the images are printed, a bonding means for bonding a reverse surface of each image formed portion of the plural-row printed photographic paper and a reverse surface of a postcard, being bonded together after having been superposed together, and a cutting means for cutting the plural-row printed photographic paper along the sides of each postcard after said bonding means bonding.

A seventh aspect of the present invention is a postcard-affixed photographic print manufacturing apparatus according to the fifth aspect of the present invention further comprising a print forming means for forming a plural-row printed photographic paper on which a plurality of image rows are formed, by developing the photographic printing paper on which the images are printed, a separating means for separating the plural-row printed photographic paper into single-row printed photographic papers on each of which an image row is formed, by cutting the plural-row printed photographic paper at a region between the image rows formed thereon, a bonding means for bonding a reverse surface of each image formed portion of the single-row printed photographic papers and a reverse surface of a postcard, by being bonded together after having been superposed together, and a cutting means for cutting the single-row printed photographic papers along the sides of each postcard after said bonding step having been completed, wherein the bonding means is at least one bonding apparatus for carrying out bonding.

An eighth aspect of the present invention is a postcard-affixed photographic print manufacturing apparatus according to the fifth aspect of the present invention further comprising a first punching means for, before images are printed, punching, in the photographic printing paper and along a conveying direction of the photographic printing paper, image printing position demarcating holes which each demarcate a printing position of one image and order printing position demarcating holes which each demarcate a printing position of one order, and a second punching means for, after the images are printed, punching in the photographic printing paper and along the conveying direction of the photographic printing paper, image demarcation indicating holes which each indicate demarcation of one image and order demarcation indicating holes which each indicate demarcation of one order, wherein, by the printing means, for each image printing position demarcating hole, printing of plural images which are aligned in a transverse direction of the photographic printing paper is repeated along the longitudinal direction of the photographic printing paper, and for each order printing position demarcating hole, printing of images of a different order commences, and the second punching means whose hole punching position is adjustable is adjusted such that holes are punched at positions corresponding to positions indicating demarcation of images and at positions corresponding to positions indicating demarcation of orders in each row of the plural-image rows due to a suitable combination of the holes punched by the first punching means and the holes punched by the second punching means.

A ninth aspect of the present invention is a method of manufacturing a photographic print comprising an image printing step in which images are printed such that a plurality of image rows, each having a plurality of images which are formed along the longitudinal direction of an elongated photographic printing paper, are formed in the transverse direction of the photographic printing paper on the photographic printing paper.

A tenth aspect of the present invention is a method of manufacturing a photographic print according to the ninth aspect of the present invention further comprising a print forming step in which the photographic printing paper on which the images are printed is developed so as to form a plural-row printed photographic paper on which a plurality of image rows are formed, and a cutting step of cutting the obtained plural-row printed photographic paper into each image formed portion formed thereon.

An eleventh aspect of the present invention is a method of manufacturing a photographic print according to the tenth aspect of the present invention, wherein the cutting step comprises a first cutting step of separating the plural-row printed photographic paper into a single-row printed photographic papers on each of which an image row is formed, by cutting the plural-row printed photographic paper at a region between the image rows formed thereon, and a second cutting step of cutting the single-row printed photographic papers into each image formed portion formed thereon.

A twelfth aspect of the present invention is a method of manufacturing a photographic print according to the ninth aspect of the present invention further comprising a separating step of separating the photographic printing paper on which the plurality of image rows are formed into photographic printing papers each on which image rows is formed, by cutting the photographic printing paper on which the plurality of image rows are formed at a region between the image rows thereof, a print forming step in which a single-row printed photographic papers are formed by developing the photographic printing paper on which image row is formed, separated in said separating step, and a cutting step of cutting the single-row printed photographic papers into each image formed portion formed thereon.

A thirteenth aspect of the present invention is a photographic print manufacturing apparatus comprising printing means for printing images in such a way that a plurality of image rows, each having a plurality of images which are formed along the longitudinal direction of an elongated photographic printing paper, are formed in the transverse direction of the photographic printing paper on the photographic printing paper.

A fourteenth aspect of the present invention is a photographic print manufacturing apparatus according to the thirteenth aspect of the present invention further comprising a print forming means for forming a plural-row printed photographic paper on which a plurality of image rows are formed, by developing the photographic printing paper on which the images are printed, and a cutting means for cutting the obtained plural-row printed photographic paper into each image formed portion formed thereon.

A fifteenth aspect of the present invention is a photographic print manufacturing apparatus according to the fourteenth aspect of the present invention, wherein the cutting means comprises a first cutting means for separating the plural-row printed photographic paper into a single-row printed photographic papers on each of which an image row is formed, by cutting the plural-row printed photographic paper at a region between the image rows formed thereon, and a second cutting means for cutting the single-row printed photographic papers into each image formed portion formed thereon.

A sixteenth aspect of the present invention is a photographic print manufacturing apparatus according to the thirteenth aspect of the present invention further comprising a separating means for separating the photographic printing paper on which the plurality of image rows are formed into photographic printing papers each on which image rows is formed, by cutting the photographic printing paper on which the plurality of image rows are formed at a region between the image rows thereof, a print forming means for forming a single-row printed photographic papers by developing the photographic printing paper on which image row is formed, separated by said separating means, and a cutting means for cutting the single-row printed photographic paper into each image formed portion formed thereon.

In the first to third and fifth to seventh aspects of the present invention, in the forming of a postcard-affixed photographic print in which a postcard is bonded to the back of the photographic print, a plurality of image rows, each having a plurality of images, are printed along the transverse direction of an elongated photographic printing paper.

When images are printed, a plurality of image rows each having a plurality of images can be printed along the transverse direction of the photographic printing paper by repeating, in the longitudinal direction of the photographic printing paper, the process of printing a plurality of identical images which are aligned to the transverse direction of the photographic printing paper. In this case, if images for plural orders are printed, an image for the same order is printed over the respective image rows because an order usually includes a large number of the same image.

On the other hand, when images are printed, a plurality of image rows each having a plurality of images may be printed along the transverse direction of the elongated photographic printing paper by repeating, in the longitudinal direction of the photographic printing paper, the process of printing a plurality of different images which are aligned to the transverse direction of the photographic printing paper. In this case, if images for a plurality of orders are printed, images for the same order are printed so as to be included in the same image row.

A plural rows printed photographic paper, on which a plurality of image rows are formed, is formed by developing the printed photographic printing paper. In the first, second, fifth and sixth aspects of the present invention, a postcard-affixed photographic print is formed by cutting along the sides of the postcard after the back of an image forming portion of the plural rows printed photographic paper and the back of a postcard are superposed and bonded together and the plural rows printed photographic paper and the postcard are bonded.

When the plural rows printed photographic paper and the postcard are bonded together, the plural rows printed photographic paper and the postcard may be bonded without processing the plural rows printed photographic paper at all. Alternatively, as in the third and seventh aspects of the present invention, they may be bonded after separating the plural rows printed photographic paper into single row printed photographic papers each on which single row is formed by cutting between the portions on which the image rows are formed. When the plural rows printed photographic paper is separated into the single row printed photographic papers as in the third and seventh aspects of the present invention, a conventional bonding apparatus for processing a printed photographic paper on which a single row of images is formed can be effectively used.

In the cutting step for forming the postcard-affixed photographic print, all the sides of only a print or all the sides of a print and a postcard are cut sequentially or concurrently, as the sides of the postcard do not generally conform to the peripheral configuration of the image. However, if the print and the postcard are bonded in such a way that one side of the postcard is registered with one of the peripheral configuration of the image, they can be cut along the sides which do not conform to the others of peripheral configuration.

Thus, the present invention improves the efficiency in a series of processings as the number of images which can be processed on one roll of an elongated photographic printing paper is increased. It should be noted that the image described herein includes not only an image of one frame of a photographic film but also, for example, an image designed to fit within a postcard-size region by reducing or enlarging images of a plurality of frames.

In the fourth and eighth aspects of the present invention, demarcating the printing position of the respective images holes which each demarcate a printing position of one image (one frame) (positioning frame holes) and demarcating the printing position of the respective orders holes which each demarcate a printing position of one order (first sort holes) are punched by the first punch in the elongated photographic printing paper and along the conveying direction of photographic printing paper before printing.

A plurality of image rows are printed by repeating, in the longitudinal direction of photographic printing paper, a process of printing a plurality of images which are aligned to the transverse direction of photographic printing paper at a region between demarcating the printing position of the respective images holes. When the first sort hole is detected, the image to be printed is switched to the next image to be printed, and the operation to print a plurality of images which are aligned to the transverse direction of the photographic printing paper is again repeated in the longitudinal direction of photographic printing paper.

For printing images on the photographic printing paper, a plurality of image rows, each having a plurality of images, are printed along the transverse direction of the elongated photographic printing paper. When the images are printed, the plurality of image rows each having a plurality of images can be printed along the transverse direction of the elongated photographic printing paper by repeating, in the longitudinal direction of the photographic printing paper, a process of printing a plurality of identical images which are aligned to the transverse direction of the photographic printing paper. In this case, if images for plural orders are printed, an image for the same order is printed over the respective image rows because an order usually includes a large number of the same image.

On the other hand, when images are printed, a plurality of image rows each having a plurality of images may be printed along the transverse direction of the elongated photographic printing paper by repeating, in the longitudinal direction of the photographic printing paper, a process of printing a plurality of different images which are aligned to the transverse direction of the photographic printing paper. In this case, if images for plural orders are printed, images for the same order are printed so as to be included in the same image row.

In the photographic printing paper on which images are printed, indicating demarcation of the respective images holes which each indicate demarcation of one image (identification frame holes) and indicating demarcation of the respective order holes which each indicate demarcation of one order (second sort holes) are punched by the second punch along the conveying direction of the photographic printing paper. At this time, due to the combination of the holes punched by the first punch and the holes punched by the second punch, namely, due to the combination of the four types of holes, i.e., the positioning frame holes for printing which are punched by the first punch, the first sort holes for printing which are punched by the first punch, the identification frame holes punched by the second punch, and the second sort holes punched by the second punch, the punching positions of the second punch are adjusted so that the respective holes are punched in positions corresponding to positions indicating demarcation of one frame of each image row and in positions corresponding to positions indicating demarcation of one order of each image row (the sort positions).

Therefore, in the fourth and eighth aspects of the present invention, the positions of the holes punched by the second punch are adjusted in such a way that the holes punched by the first punch serve as indicating demarcation of the respective images holes (identification frame holes) and indicating demarcation of the respective orders holes (sort holes). Therefore, the positioning frame holes originally provided for demarcating the printing position of the respective images at the time of printing at one image row serve as the identification frame holes for indicating demarcation of the respective images in the subsequent processing, and the sort holes (first sort holes) provided for demarcating the printing position of the respective orders at the time of printing at another image row serve as the sort holes for indicating demarcation of the respective orders in the subsequent processing.

Namely, as the frame holes and the sort holes are always punched in each of the image rows, all of the image rows can be processed concurrently, for example, in the processings after cutting into the respective image rows, thereby improving the productivity. Thus, the productivity can be improved by expediting processing in the printing step and in steps thereafter without greatly modifying a digital image recording device which has been conventionally used. Naturally, the efficiency in processing an elongated photographic printing paper is improved. It should be noted that the image described herein includes not only an image of one frame of a photographic film but also, for example, an image designed to fit within a postcard-size region by reducing or enlarging images of a plurality of frames.

The photographic printing paper on which a plurality of image rows have been printed by an image printing method of this kind is subjected to color development, bleach-fixing, and rinsing processings, and thereafter is dried to form a plural rows printed photographic paper on which plural image rows are formed (a plural rows printed photographic paper). The obtained plural rows printed photographic paper is cut into the respective image rows to form single-row printed photographic papers. After bonding a postcard to the back of an image of the respective single-row printed photographic paper, the four sides of the images are cut to postcard dimensions to obtain a postcard-affixed photographic print.

When the plural rows printed photographic paper is cut into the single-row printed photographic papers, there are frame holes and sort holes punched in corresponding positions in each of the individual single-row printed photographic papers, respectively. Therefore, the respective single-row printed photographic papers can be processed concurrently thereafter. By processing these single-row printed photographic papers concurrently, the produceability of the postcard-affixed photographic prints is improved.

As the frame holes and sort holes are punched in corresponding positions in each of the individual single-row printed photographic papers, a conventional manufacturing line can be used for the subsequent processings without greatly modifying apparatuses, such as a bonding apparatus, which have been conventionally used.

In the ninth to eleventh and thirteen to fifteenth aspects of the present invention, a plurality of image rows, each having a plurality of images, are printed along the transverse direction of the elongated photographic printing paper. Thus, a large quantity of image can be printed at a time, thereby remarkably improving the efficiency in processing.

When images are printed, images formed on a film may be printed in one image row, or images formed on a film may be printed over plural rows. Naturally, when the same person orders the printing of several films, their images may be printed in one image row per order or their images may be printed over the plural rows.

The images printed thus are developed to make a printed photographic print. The photographic print will be cut into each image forming region at the last stage. As in eleventh and fifteenth aspects of the present invention, the plural rows printed photographic paper may be cut at a region between the image rows thereof so as to be separated into single row printed photographic papers, before cutting into each image region. The method in eleventh and fifteenth aspects of the present invention is effective because the conventionally employed apparatus can be used without modification.

In twelfth and sixteenth aspects of the present invention, a plurality of image rows, each having a plurality of images, are printed along the transverse direction of the elongated photographic printing paper, and then cut at a region between image rows and then developed. When images are printed, a process of printing image which are aligned to the transverse direction of the photographic printing paper can be repeated, or a plurality of rows can be printed along the longitudinal direction of the photographic printing paper.

The conventionally employed apparatus can be effectively used without modification, by cutting the photographic printing paper at a region between image rows so as to be separated into each image row before developing process.

Thus, the ninth and sixteenth aspects of the present invention improve the efficiency in a series of processings as the number of images which can be processed on one roll of an elongated photographic printing paper is increased. It should be noted that the image described in the ninth and sixteenth aspects of the present invention includes not only an image of one frame of a photographic film but also an image designed to fit within a single image forming region by reducing or enlarging images of a plurality of frames.

BRIEF DESCRIPTION OF THE DRAWINGS

FIG. 1 is a flow chart depicting a flow of a method of manufacturing a postcard-affixed photographic print of the present invention.

FIG. 4A is a partially enlarged view of photographic print illustrated in FIG. 3.

FIG. 4B is a partially enlarged view of photographic print illustrated in FIG. 3.

DESCRIPTION OF THE PREFERRED EMBODIMENTS

The embodiments of the present invention will be described hereinafter with reference to FIGS. 1 through 6. FIG. 1 is a simplified flow chart depicting a flow of a method of manufacturing a postcard-affixed photographic print of the present invention.

In the present embodiment, first of all, images to be printed, each one of which is for one postcard, are printed by a digital image recording device 11 which will be described later, such that two images are aligned to the transverse direction of an elongated thin color paper having a predetermined width (for example, a width of 203 mm).

The digital image recording device 11, which will be described later in detail, punches holes for demarcating the printing position of the respective images (positioning frame holes), holes for demarcating the printing position of the respective orders (first sort holes), holes for indicating demarcation of the respective images (identification frame holes) and holes for indicating demarcation of the respective orders (second sort holes). The positioning frame holes are punched in a substantially central region of the color paper, such that two identical images, which are aligned to the transverse direction of the color paper, are printed in a region between the positioning frame holes. The first sort hole is punched as demarcation between the previously printed image and the next image to be printed. Namely, when the number of prints reaches the number of prints for one order, as demarcation of one order, then, printing of the next order begins, and the images of the next order are printed, i.e., printing is carried out again until the number of printed images reaches the number of images of one order. When printing of all orders for that color paper has been completed, the color paper is wound beginning from the portion thereof which was printed last, so as to form a printed rolled color paper 50.

The obtained printed rolled color paper 50 is set in a developing apparatus 13. The developing apparatus 13 comprises four tank portions, i.e., a color development tank, a bleach-fixing tank, a rinsing tank, and a drying portion. In addition, a rack provided with plural sets of feed roller pairs is disposed in each tank and at positions connecting the respective tanks, so as to form a feed path of the printed color paper 50 which starts from the color development tank, passes through the bleach-fixing tank, and leads to the drying portion via the rinsing tank.

The rolled color paper 50, on which images for a plurality of orders are printed by the digital image recording device 11, is set in the developing apparatus 13. One end of the rolled color paper 50 is pulled out by a lead-in roller provided at the entrance of the developing apparatus 13, and then the color paper 50 is fed by the plural sets of feed roller pairs through the color development tank, the bleach-fixing tank, the rinsing tank, and the drying portion in the that order.

Figure 3:
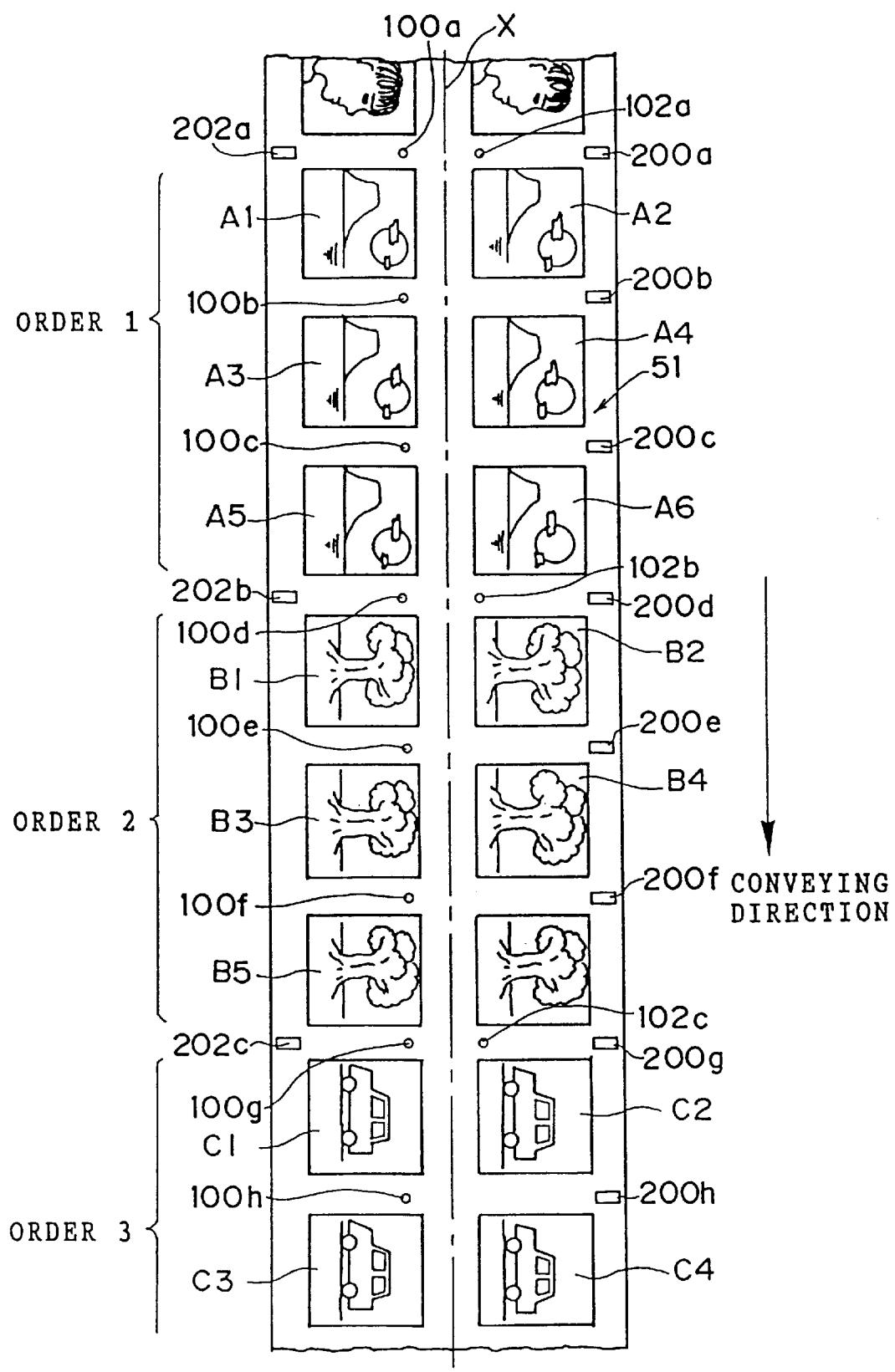
FIG. 3 is a partial explanatory view of a two-row printed photographic paper of the present embodiment.

The printed color paper 50 is subjected to drying processing after undergoing the processings of development, bleach-fixing, and washing while passing through the respective tanks. Then, the color paper 50 is discharged from the developing apparatus 13 as a printed photographic paper on which two rows of images are formed as shown in FIG. 3. The discharged portion of the printed photographic paper is wound up sequentially to form a rolled two-row printed photographic paper 51. Then, the rolled two-row printed photographic paper 51 is cut into the respective image rows by a slitter 15 which will be described later, and each row is wound up to make rolled single-row printed photographic paper 52 and 53.

The rolled single-row printed photographic papers 52 and 53 are set in postcard bonding apparatus 17A and 17B, which will be described later, respectively, so that they are drawn out from one end and a postcard is bonded to the reverse surface of each image. In FIG. 1, the manufacturing efficiency is improved to a large extent due to the parallel processing carried out after the slitter 15 by the two postcard bonding apparatus 17A and 17B. Naturally, only one postcard bonding apparatus 17A may be used to process single-row printed photographic papers sequentially roll by roll by bonding postcards thereto, without altering the manufacturing line which has been conventionally used.

The postcard bonding apparatus 17A and 17B are provided with cutting apparatus (not shown). A single-row printed photographic paper with postcards bonded to the rear surface thereof is transported as it is placed into the cutting apparatus, and four sides of each image are cut in such a way that it is made into a postcard size to manufacture a postcard-affixed photographic print P. The obtained postcard-affixed photographic prints P are counted by counters 19A and 19B, and sorted into orders based on the number of prints for each order. Then, each order set is bound by binding devices 21A and 21B for shipment.

Figure 2:
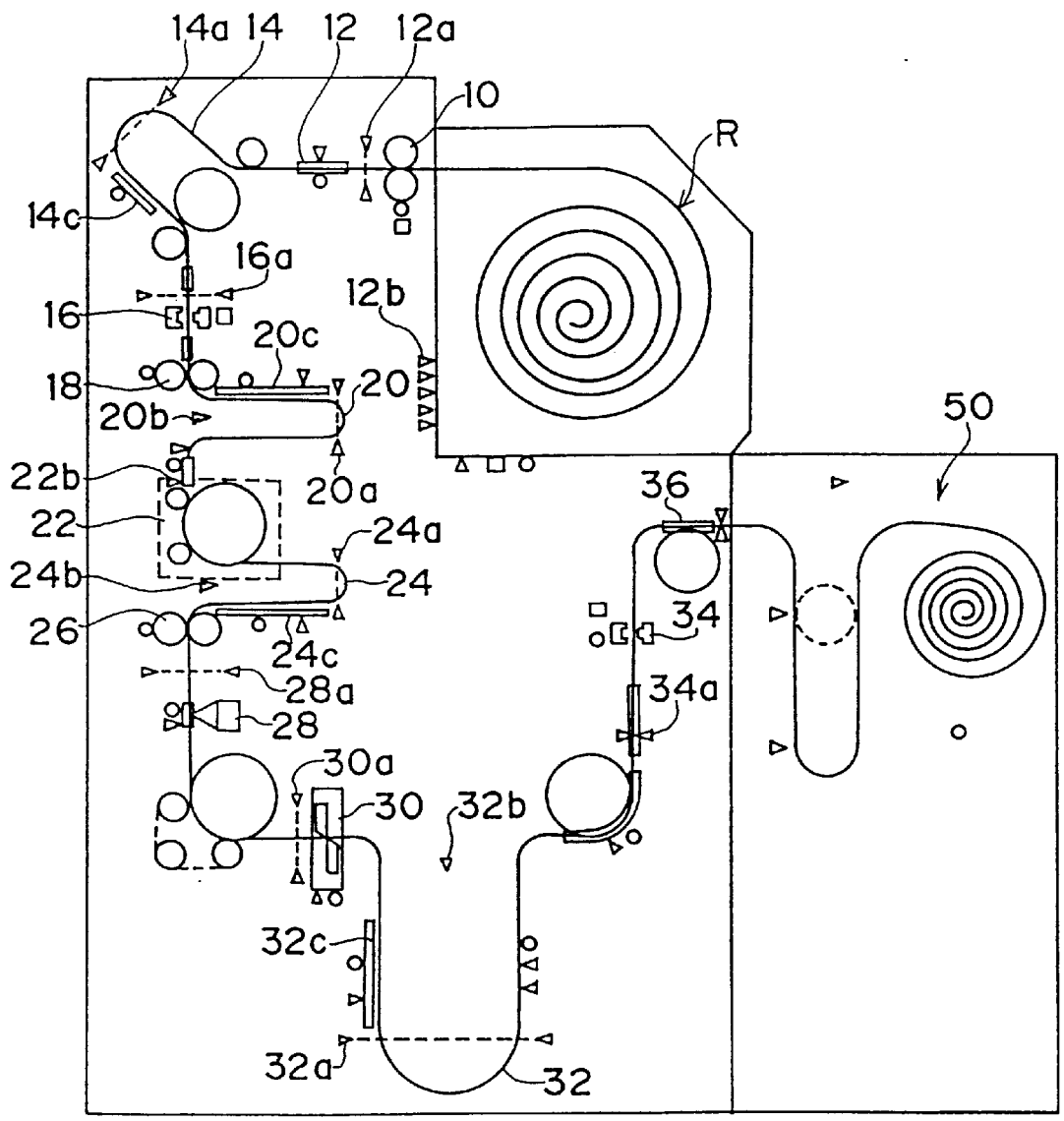
FIG. 2 is a schematic structural view of a digital image recording device.

FIG. 2 is a schematic structural view of the digital image recording device 11. The digital image recording device 11 has a lead-in roller pair 10, a first punch 16, a printing section 22, a second punch 34 and feed roller pairs 18 and 26.

When the digital image recording device 11 is turned on to start image recording after a rolled color paper R is set therein, the color paper R is pulled into the apparatus by the lead-in roller pair 10.

The color paper R pulled in by the lead-in rollers 10 forms a first loop 14 after it is conveyed along a paper width guide 12 whose guide width is changeable based on the paper width detected by a paper width detecting sensor 12a. Subsequently, the color paper R is guided to the first punch 16 for positioning frame holes and first sort holes to be punched in the predetermined, fixed positions.

When the first punch 16 receives a signal from a leading edge sensor 16a which detects the leading edge of the color paper R, the conveying of the color paper R is stopped each time the color paper R is conveyed a predetermined amount (a distance which is slightly longer than the subscanning direction image of an image to be recorded), and the first punch 16 punches round positioning frame holes 100a, 100b, 100c, etc. (see FIG. 3) in the color paper R. The round positioning frame holes 100a, 100b, 100c, etc., which are provided for demarcating the printing position of the respective images, are punched, as shown in FIG. 3, on one side of the broken line X indicating the central line at the substantially central position of the color paper R. The positioning frame holes 100a, 100b, 100c, etc. are punched at the left side of the broken line X in the present embodiment.

Further, the first punch 16 punches round first sort holes 102a, 102b, 102c, etc. (see FIG. 3) on the side opposite to the side where the positioning frame holes are punched in relation to the broken line X at the substantially central position of the color paper R. Namely, the round first sort holes 102a, 102b, 102c, etc. are punched at the right side of the broken line X in the present embodiment. These first sort holes 102a, 102b, 102c, etc., which are provided for demarcating the printing position of the respective orders, are punched in proximity to the positioning frame holes 100a, 100d, 100g, etc. shown in FIG. 3.

After the positioning frame holes 100a, 100b, 100c, etc. and the first sort holes 102a, 102b, 102c, etc. are punched, the color paper R is fed by the first feed roller pair 18 to form a second loop 20.

Then, the color paper R delivered out from the second loop 20 is guided to the printing section 22. A hole detecting sensor 22b is provided in the printing section 22. In the vicinity of the printing section 22, a laser scanning device (not shown) is disposed for recording the image by using a polygon mirror to scan-expose, onto the color paper R, laser lights, i.e., R, G, B lights, which have been modulated in accordance with image data for recording.

In the printing section 22, when the positioning frame holes 100a, 100b, 100c, etc. punched in the color paper R are detected by the hole detecting sensor 22b, the laser scanning device main-scans with lasers the color paper R which is being fed so that two identical images which are aligned to the transverse direction of the color paper are printed by scan exposure in the region between the positioning frame holes (for example, the region is demarcated between the positioning frame hole 100a and the positioning frame hole 100b in the longitudinal direction of the color paper). By repeating this operation, two image rows each having a plurality of images are printed along the longitudinal direction of the elongated color paper R. Further, when the first sort hole (for example, 102a, 102b, 102c, etc.) is detected by the hole detecting sensor 22b, the image to be printed is switched to a predetermined next image to be printed next, and printing process is continued in the ways mentioned above.

After forming a third loop 24, the color paper R on which images are printed is delivered out by a second feed roller pair 26 into a back printing portion 28 where necessary information such as an order number, an order frame number, and the like are printed on the back (the reverse surface) of the color paper R delivered in by the second feed roller pair 26. A frame hole detecting sensor 28a is provided upstream of the back printing portion 28a. The position of back printing is determined based on the frame hole positions detected by the frame hole detecting sensor 28a.

The color paper R whose reverse surface has been subjected to such back printing is further guided to a cutter portion 30. The cutter portion 30, which cuts the color paper R when the printing processing is finished is actuated after the passing of the image printed last is confirmed, so that the color paper R is cut so as to be divided into a printed region and a unprinted region. The obtained printed color paper R is forwarded as the printed color paper R to the subsequent processing, while the color paper R on which nothing has been printed is transported backward and wound up so as to be used for the next exposure.

After passing the cutter portion 30, the color paper R forms a fourth loop 32 and is then guided to a second punch 34. The second punch 34 is constructed so that the punching position thereof is adjustable in accordance with the width of the color paper R. The second punch 34 punches rectangular identification frame holes 200a, 200b, 200c, etc. (see FIG. 3) in the vicinity of one side edge of the color paper R along the longitudinal direction of the color paper R. The identification frame holes 200a, 200b, 200c, etc. are provided for indicating demarcation of the respective images. The second punch 34 also punches rectangular second sort holes 202a, 202b, 202c, etc. (see FIG. 3) in the vicinity of the other side edge of the color paper R along the longitudinal direction of color paper R for each order. The second sort holes 202a, 202b, 202c, etc. are provided for indicating demarcation of the respective orders.

As shown in FIG. 3, the punching positions of the identification frame holes 200a, 200b, 200c, etc. formed by the second punch 34 correspond to those of the positioning frame holes 100a, 100b, 100c, etc. punched by the first punch 16, respectively. Further, the punching positions of the second sort holes 202a, 202b, 202c, etc. correspond to those of the first sort holes 102a, 102b, 102c, etc. punched by the first punch 16, respectively.

After the identification frame holes 200a, 200b, 200c, etc. and the second sort holes 202a, 202b, 202c, etc. are punched by the second punch 34, the color paper R is fed out of the digital imaging apparatus by a delivery mechanism 36, and is wound up by a winding means to form a printed rolled color paper 50.

Although the digital image recording device 11 suspends transportation of color paper R when the first punch 16 and the second punch 34 punch holes, the digital image recording device 11 transports the color paper R continuously during the scan exposure by the printing section 22. Therefore, the four loops 14, 20, 24, and 32 are provided to absorb the difference in the transportation speeds at the region between, for example, the first punch 16 and the printing section 22 where the transportation of the color paper R is being suspended intermittently in the stage therebefore (i.e., at the first punch 16) and the color paper R is being transported continuously at the stage thereafter (i.e., in the printing section 22). These loops 14, 20, 24, and 32 are provided with loop detecting sensors 14a, 20a, 24a, and 32a, respectively, to control the size of the loops on the basis of detection signals from the loop detecting sensors 14a, 20a, 24a, and 32a so that large tension does not act on portions of the color paper R.

The rolled color paper 50 on which prints for a plural number of orders have been printed by the digital image recording device 11 is developed by a developing machine 13 to form a printed photographic paper on which two rows of successive images are formed as shown in FIG. 3, which is then wound up to form a rolled two-row printed photographic paper 51.

As can be seen from FIG. 3 wherein images A1 through A6 are for order 1 and images B1 through B5 are for order 2, prints for one order are formed over the two image rows. Therefore, for the order 1 wherein the number of ordered prints is even, it is possible to make the desired number of prints without waste over the two rows by printing half of the ordered prints in one row. For the order 2 wherein the number of ordered prints is odd, however, the number of prints to be made is set by adding one more print to the number of ordered prints to make the number even. Then, the same number of prints are formed over two rows. When the prints are counted in the subsequent stage, the number is adjusted by deducting one print.

Figure 5:
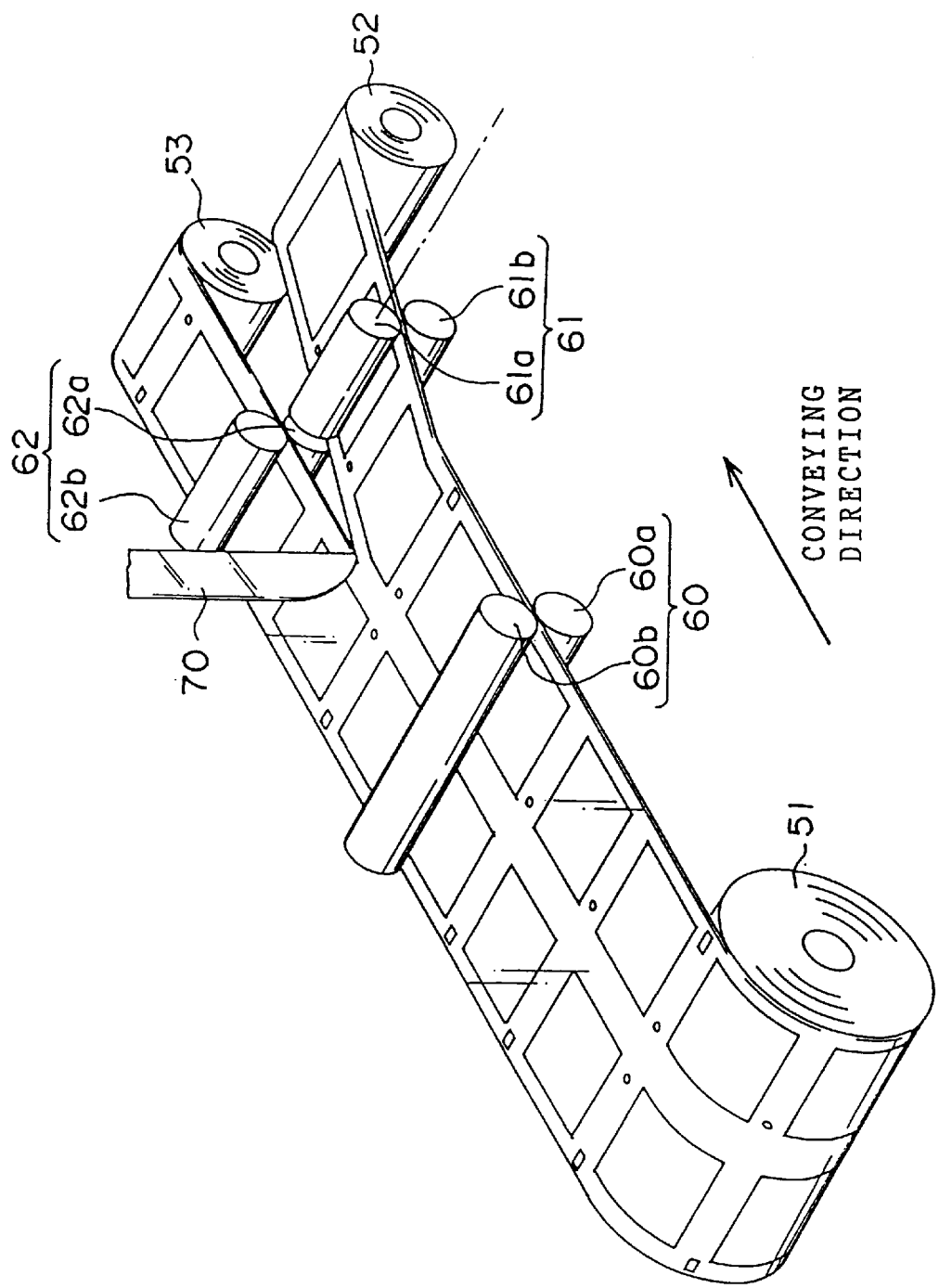
FIG. 5 is an explanatory view showing principal portions of a slitter.

FIG. 5 is a schematic explanatory view showing principal portions of a slitter 15 of the present embodiment. Here, for the purpose of description, the body of the slitter 15 and the respective driving devices such as motors, etc. provided in the slitter 15 are omitted. The rolled two-row printed photographic paper 51, a feed roller pair 60 for two rows for feeding the rolled two-row printed photographic paper 51, a cutter portion 70 for cutting the rolled two-row printed photographic paper 51 at the center into single-row printed photographic papers 52 and 53, and feed roller pairs 61 and 62 for single rows for feeding the single-row printed photographic papers 52 and 53 are illustrated in FIG. 5.

The two-row feed roller pair 60 is composed of a drive roller 60a and a driven roller 60b, and feeds the two-row printed photographic paper 51 nipped between the drive roller 60a and the driven roller 60b by the rotational force of the drive roller 60a.

Further, in the same manner as the two-row feed roller pair 60 described above, the two single-row feed roller pairs 61 and 62 are composed of drive rollers 61a and 62b and driven rollers 61b and 62b, and feed the single-row printed photographic papers 52 and 53 nipped between the drive rollers 61a and 61b and the driven rollers 62a and 62b by the rotational force of the drive rollers 61a and 62a.

When the rolled two-row printed photographic paper 51 is set in the slitter 15, the two-row printed photographic paper 51 is drawn out from one end thereof and is conveyed by the two-row feed roller pair 60. The cutter portion 70 is provided after the two-row feed roller pair 60. At the cutter portion 70, a blade is disposed at the central position of the two-row printed photographic paper 51, i.e., on the broken line X in FIG. 3. The two-row printed photographic paper 51 is cut along the broken line X by the cutter portion 70 as the two rows printed photographic paper 51 passes the cutter portion 70. The respective cut rows are then fed by the single-line feed rollers 61 and 62, and are wound on winding reels to form the two rolled single-row printed photographic paper 52 and 53 on each of which images are printed successively in one row.

Referring now to FIG. 4A and FIG. 4B, the state of the two-row printed photographic paper 51 before being cut by the slitter 15 is shown in FIG. 4A, and the states of the single-row printed photographic papers 52 and 53 after being separated by the slitter 15 is shown in FIG. 4B. Here, for the purpose of description, FIGS. 4A and 4B are partially enlarged views of the region between the positioning frame hole 100a and the positioning frame hole 100b of FIG. 3. In the present embodiment, the dimensions of the identification frame holes 200a, 200b, etc. and the second sort holes 202a, etc. formed by the second punch are 1.2 (length) mm×3 mm (width) in the longitudinal direction.

When the two-row printed photographic paper 51 shown in FIG. 4A is cut along the broken line X by the slitter 15, the positioning frame holes 100a, 100b, 100c, etc. punched by the first punch 16 and the second sort holes 202a, 202b, 202c, etc. punched by the second punch 34 are located in one single-row printed photographic paper 52, and the first sort holes 102a, 102b, 102c, etc. punched by the first punch 16 and the identification frame holes 200a, 200b, 200c, etc. punched by the second punch 34 are located in the other single-row printed photographic paper 53, as shown in FIG. 4 B.

Namely, in the single-row printed photographic paper 52, the positioning frame holes 100a, 100b, 100c, etc. provided for printing process are used as the frame holes for the detection of frame positions by a postcard bonding apparatus in the subsequent stage. For the single-row printed photographic paper 53, the first sort holes 102a, 102b, 102c, etc. provided for printing process are used as the sort holes for the detection of sort positions by a postcard bonding apparatus in the subsequent stage. Also, in the single-row printed photographic paper 53, the identification frame holes 200a, 200b, 200c, etc. provided for printing process are used as the frame holes for the detection of frame positions by a postcard bonding apparatus in the subsequent stage. For the single-row printed photographic paper 52, the second sort holes 202a, 202b, 202c, etc. provided for printing process are used as the sort holes for the detection of sort positions by a postcard bonding apparatus in the subsequent stage.

The positioning frame holes 100a, 100b, 100c, etc. and the first sort holes 102a, 102b, 102c, etc. are located at positions which are the same distance from the cut edge X (an edge newly formed by cutting along the broken line X). In the present embodiment, the positioning frame holes 100a, 100b, 100c, etc. of the single-row printed photographic paper 52 are located at positions at a first predetermined distance (for example, 40.7 mm) from the right edge (the cut edge) X, and the first sort holes 102a, 102b, 102c, etc. of the single-row printed photographic paper 53 are located at positions at the first predetermined distance (for example, 40.7 mm) from the left edge (the cutting edge) X.

Similarly, the identification frame holes 200a, 200b, 200c, etc. and the second sort holes 202a, 202b, 202c, etc. punched by the second punch are located at positions which are at the same distance from the originally formed edge portions Z and Y, respectively. In the present embodiment, the central positions of the second sort holes 202a, 202b, 202c, etc. are located at positions at a second predetermined distance (for example, 3.9 mm) from the left edge Y, and the central positions of the identification frame holes 200a, 200b, 200c, etc. are located at positions at the second predetermined distance (for example, 3.9 mm) from the right edge Z. Namely, the punched holes (the frame holes and the sort holes) formed in the single-row printed photographic paper 52 and the single-row printed photographic paper 53 are formed at positions such that the distances between the positioning frame holes 100a, 100b, 100c, etc. and the cut edge X and the distances between the first sort holes 102a, 102b, 102c, etc. and the cut edge X are equal, and the distances between the centers of the identification frame holes 200a, 200b, 200c, etc. and the originally formed edge portion Z and the distances between the centers of the second sort holes 202a, 202b, 202c, etc. and the originally formed edge portion Y are equal.

Figure 6:
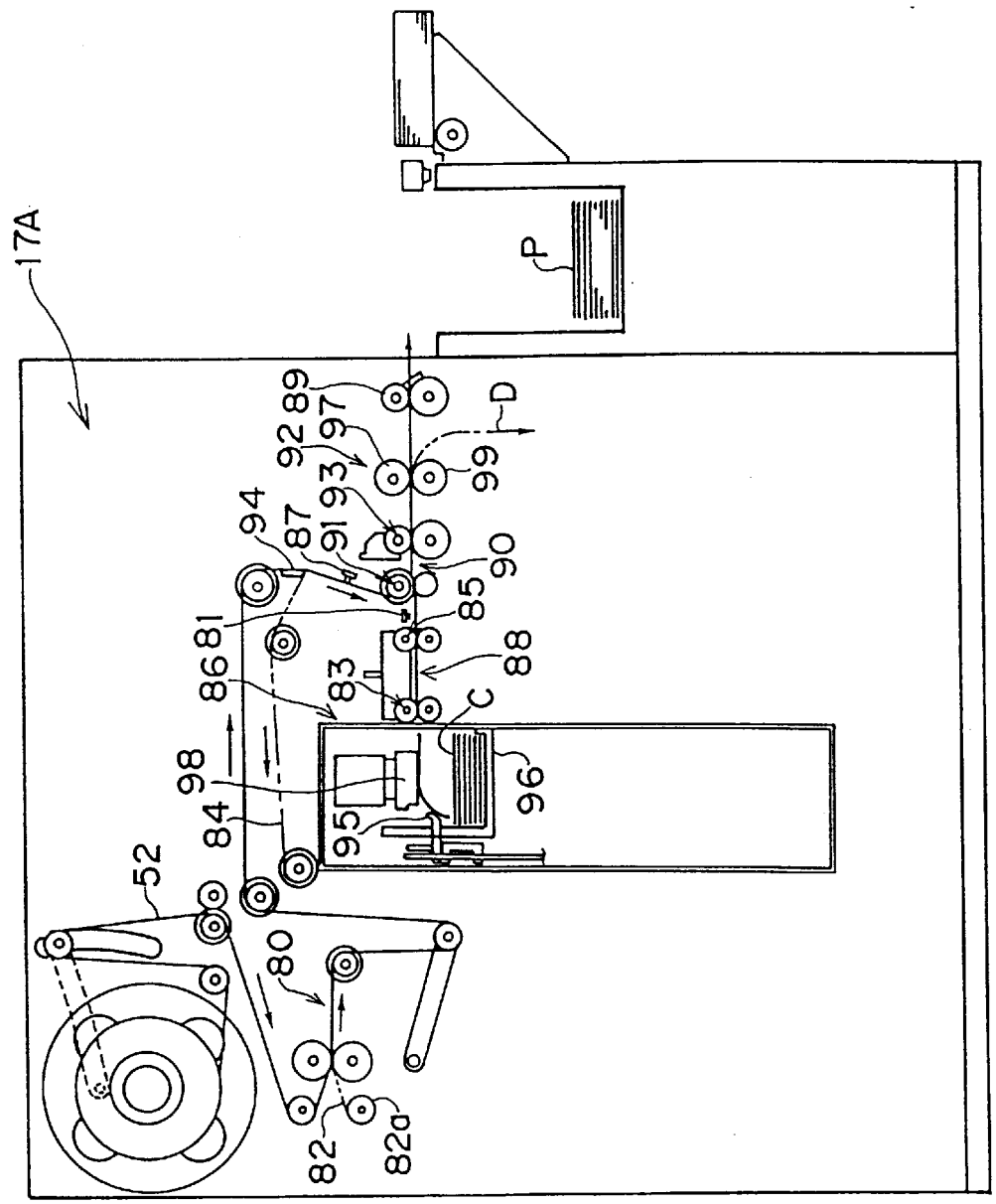
FIG. 6 is a schematic structural view of a postcard bonding apparatus used in the present embodiment.

FIG. 6 is a schematic structural view of a postcard bonding apparatus. After bonding a postcard C to the back (reverse surface) of a region for one image, the postcard bonding apparatus cuts the rolled single-row printed photographic papers 52 and 53 obtained in the above-mentioned process into a postcard size. Here, a postcard bonding apparatus 17A for processing the one rolled single-row printed photographic paper 52 is illustrated.

The postcard bonding apparatus 17A comprises a group of feed rollers which are a plurality of feed rollers forming the feed path of the single-row printed photographic paper 52, an adhesive application portion 80 for forming an adhesive layer on the back of the single-row printed photographic paper 52 during the conveying thereof by the group of feed rollers, a postcard supply section 86 for supplying postcards C one by one, a postcard delivery portion 88 for delivering the postcard C is supplied from the postcard supply section 86 in such a way that the postcard C is superposed together with one image printed on the single-row printed photographic paper 52, a press-contact portion 90 for bonding the back of the postcard C delivered from the postcard delivery portion 88 and the back of the single-row printed photographic paper 52 by press-contact, and a cutting portion 92 for cutting the four sides of each image of the single-row printed photographic paper 52 on which the postcard C is bonded in such a way that it is made into a postcard size.

When the postcard bonding apparatus 17A is turned on to start postcard bonding after the rolled single row printed photographic paper 52 has been set thereat, the single-row printed photographic paper 52 is drawn out from one end thereof and guided to the adhesive application portion 80 by the group of feed rollers.

In the adhesive application portion 80, a double coated tape 82 which includes an adhesive layer and a removable paper 84 is bonded to the back of the single-row printed photographic paper 52, which is then transported as is for a while by a plurality of feed rollers to ensure that the double coated tape 82 has reliably adhered to the single-row printed photographic paper 52. Subsequently, the removable paper 84 is peeled off by a scraper 94 such that only the adhesive layer remains on the back surface, and the single-row printed photographic paper 52 is introduced into the press-contact portion 90 in this state.

The postcards C are stacked face down on a raising/lowering stand 96 of the postcard supply section 86. A suction portion 98 is provided above the elevation stand 96. When the raising/lowering stand 96 is elevated by forward and reverse rotation of an unillustrated motor, the topmost postcard C of the postcards C stacked on the raising/lowering stand 96 is sucked and held by the suction portion 98.

A vertically movable separating arm 95 is disposed between the postcards C and the suction portion 98 along a rod disposed parallel to the rising/falling direction of the raising/lowering stand 96. When the raising/lowering stand 96 is lowered, the separation arm 95 drops due to its own weight together with the rest of the postcards C. However, the separation arm 95 catches on the end portion of the postcard C sucked by the suction portion 98 and is held thereby, such that the separation arm 95 cannot fall further downward with the rest of the postcards C and is stopped at that position while bending the end portion of the sucked postcard C. Due to this bending, even if a postcard C or several postcards C beneath the topmost postcard C remain, together with the topmost postcard C, at the suction portion 98 due to static electricity or the like, these postcards C separate from the topmost postcard C and fall downward, ensuring that only one postcard C is sucked by the suction portion 98. The postcard C sucked and held by the suction portion 98 is slid off and delivered to a delivery roller pair 83 of the postcard delivery portion 88.

The postcard delivery portion 88 is provided with two pairs of delivery rollers 83 and 85 which rotate synchronously, a leading edge position detecting sensor 81 for detecting the leading edge of the postcard C, and a hole position detecting sensor 87 for detecting the frame holes and sort holes punched in the single-row printed photographic paper 52.

The detection regions by the hole position detecting sensor 87 are set to correspond to the positions of the frame holes and the sort holes of the single row printed photographic paper 52. In the present embodiment, the detection regions are set at a positions at the first predetermined distance (for example, 40.7 mm) from the right edge (the cut edge) X of the single-row printed photographic paper 52 and at a position at the second predetermined distance (for example, 3.9 mm) from the left edge Y. Although not illustrated in FIG. 6, for a postcard bonding apparatus 17B which bonds postcards on the other single row printed photographic paper 53 (see FIG. 1), the detection regions are set at the position at the second predetermined distance from the right edge Z and at the position at the first predetermined distance from the left edge (the cut edge) X to correspond to the positions of the frame holes and the positions of the sort holes of the single row printed photographic paper 53.

The postcard C delivered to the delivery roller pair 83 is conveyed by the delivery roller pairs 83 and 85 toward the press-contact portion 90 in such a manner that the leading edge of the postcard C is superposed together with the leading edge position of one image detected by the hole position detecting sensor 87.

The press-contact portion 90 is provided with a first pressing roller pair 91 and a second pressing roller pair 93. The postcard C, which is delivered in such a manner as to correspond to the single-row printed photographic paper 52 and to one image of the single-row printed photographic paper 52, is pressed by the first pressing roller pair 91 so that the adhesive layer of a photographic print 52a and the back of the postcard C are adhered together. Then, after being pressed further by the second pressing roller pair 93 to ensure the adhesion, the single-row printed photographic paper 52 with the postcard C adhered thereto is guided to the cutting portion 92.

In the cutting portion 92, the single-row printed photographic paper 52 with the postcard adhered to the back is pressed by a pressing roller 99 against a roll cutter 97 rotated at a constant speed, so that the photographic print 52 is cut along the four sides of the postcard by blades which are provided at the roller cutter 97 and correspond to the peripheral configuration of the postcard.

The postcard-affixed photographic print P obtained in this way is delivered to the exterior of the postcard bonding apparatus 17A by the postcard delivery roller pair 89 provided after the roller cutter 97. At this time, the remaining portion D of the single-row printed photographic paper 52, from which the portions corresponding to the postcards have been cut out, is continuously pulled out downstream of the pressing roller 99.

The postcard-affixed photographic prints P, which have been delivered to the exterior of the postcard bonding apparatus 17A, are sorted per order and are shipped out. In the present embodiment, as prints for one order are printed over the two image rows, each of the two rolled, single-row printed photographic papers contains the same image for one order. For example, the total six prints ordered for order 1 are divided into two groups of three prints each, each of the rolled single-row printed photographic papers including one group of the three prints. On the other hand, in order 2, because the total number of ordered prints is odd (five prints were ordered), one additional print is added to the order. These six prints are divided equally between the two rolled single-row printed photographic papers such that each of the rolled single-row printed photographic papers includes three prints.

Therefore, the same images (the same order) are shipped as one set after being bonded by the postcard bonding apparatus 17A and 17B (see FIG. 1), counted by the counters 19A and 19B (see FIG. 1), and bound separately into each order by the binders 21A and 21B (see FIG. 1).

In the present embodiment, two postcard bonding apparatus are used. However, alternatively, one postcard bonding apparatus may be used to process two single-row printed photographic papers. In this case, the hole position detecting sensor 87 may be constructed so as to adjust the detection region each time to correspond to the positions of the frame holes and sort holes provided in each of the single-row printed photographic papers 52 and 53. Or, the postcard bonding apparatus whose detection region has been adjusted to the frame holes and sort holes of one single-row printed photographic paper 52 may be used for the other single-row printed photographic paper 53 as well, but before the other single-row printed photographic paper 53 is processed, the print must be set upside down.

Namely, by turning the orientation upside down, the relation of the distance between the frame holes and sort holes of the other single-row printed photographic paper 53 is the same as that of the one single-row printed photographic paper 52. Thus, the postcard bonding apparatus whose detection regions have been adjusted to the frame holes and sort holes of the one single-row printed photographic paper 52 can detect the frame holes and sort holes of the other single-row printed photographic paper 53. This obviates the need to change the positions of the detection regions for the one single-row printed photographic paper 52 and for the other single-row printed photographic paper 53, thus enabling the postcard bonding operation to proceed without hindrance.

Figure 7:
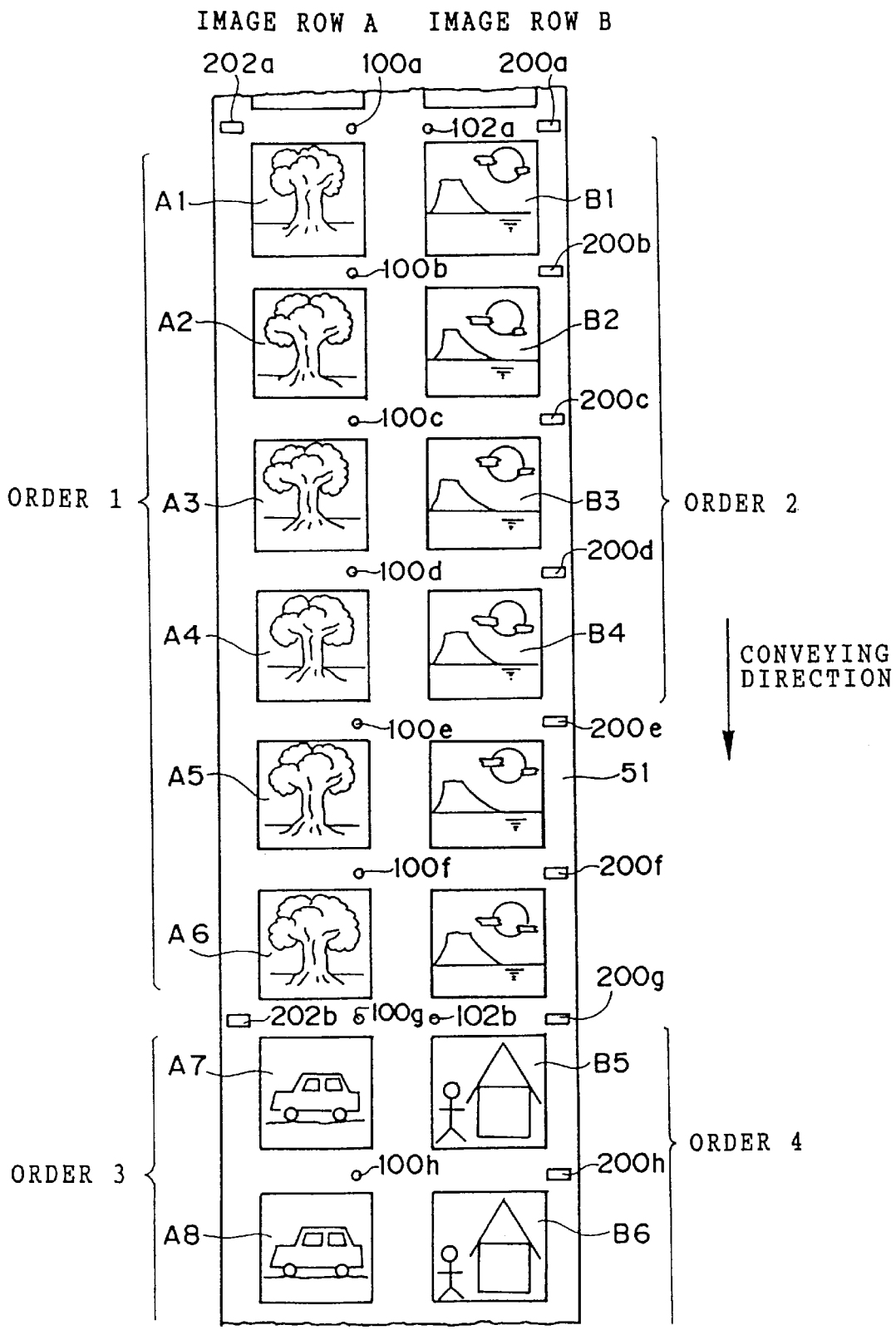
FIG. 7 is a explanatory view of a two-row printed photographic paper of another embodiment.

Another embodiment of the present invention is shown in FIG. 7. FIG. 7 illustrates an embodiment of the two-row printed photographic paper 51 on which the different images are printed in the left and right image rows. The arrangement of the frame holes and sort holes is the same as that of FIG. 3 described above. On one side of the center line (in the left-side region in the present embodiment), the positioning frame holes 100a, 100b, 100c, etc. formed by the first punch 16 and the second sort holes 202a, 202b, 202c, etc. formed by the second punch are punched. On the other side (in the right-side region in the present embodiment), the first sort holes 102a, 102b, 102c etc. formed by the first punch and the identification frame holes 200a, 200b, 200c, etc. formed by the second punch are punched.

Further, the positions where the identification frame holes 200a, 200b, 200c, etc. are punched by the second punch 34 correspond to the positions where the positioning frame holes 100a, 100b, 100c, etc. are punched by the first punch. Moreover, the positions where the second sort holes 202a, 202b, 202c, etc. are punched correspond to the positions where the first sort holes 102a, 102b, 102c, etc. are punched by the first punch.

In FIG. 7, images A1 through A6 are for the order 1, images B1 through B4 are for the order 2, etc. Namely, images for one order are printed only in one row, that is, either image row A (a row containing images A1 through A8) or image row B (a row containing images B1 to B6). In other words, the two-row printed photographic paper 51 of the present embodiment is obtained by repeating in the longitudinal direction of the color paper the process of printing two different images which are aligned to the transverse direction of the color paper, when printing is effected by the digital image recording device.

In this system, as the image row A and B are for different orders, orders for the same number of prints are not always paired together. Therefore, as in the order 2 in the image row B, after the number of ordered images are printed, the printing of images continues until the printing of the number of ordered images of order 1 in the row A is finished. Namely, when the two different images which are aligned to the transverse direction of the color paper are printed, the sort holes are punched in accordance with the demarcation of the order for the larger number of prints because the number of images to be printed are set in accordance with the order for the larger number of prints. For the order having extra prints, these extra prints are removed to adjust the number during counting at a later stage. Of course, the system may be structured in such a way that no further images are printed after the number of ordered images are printed, which obviates the need for adjustment of the number during counting at the later stage.

It should be noted that in this system, as images for one order are printed only in one image row, the bundle made by assembling prints of one order from a single-row printed photographic paper is itself one order. Therefore, the sorting in the subsequent stage is simplified because there is no need to gather the images obtained from each of the two single-row printed photographic papers into the respective orders.

It should be noted that the aforementioned embodiments describe the manufacturing of a postcard-affixed photographic print, yet naturally, the present invention can be applied to the manufacturing of a photographic print.

Figure 8:
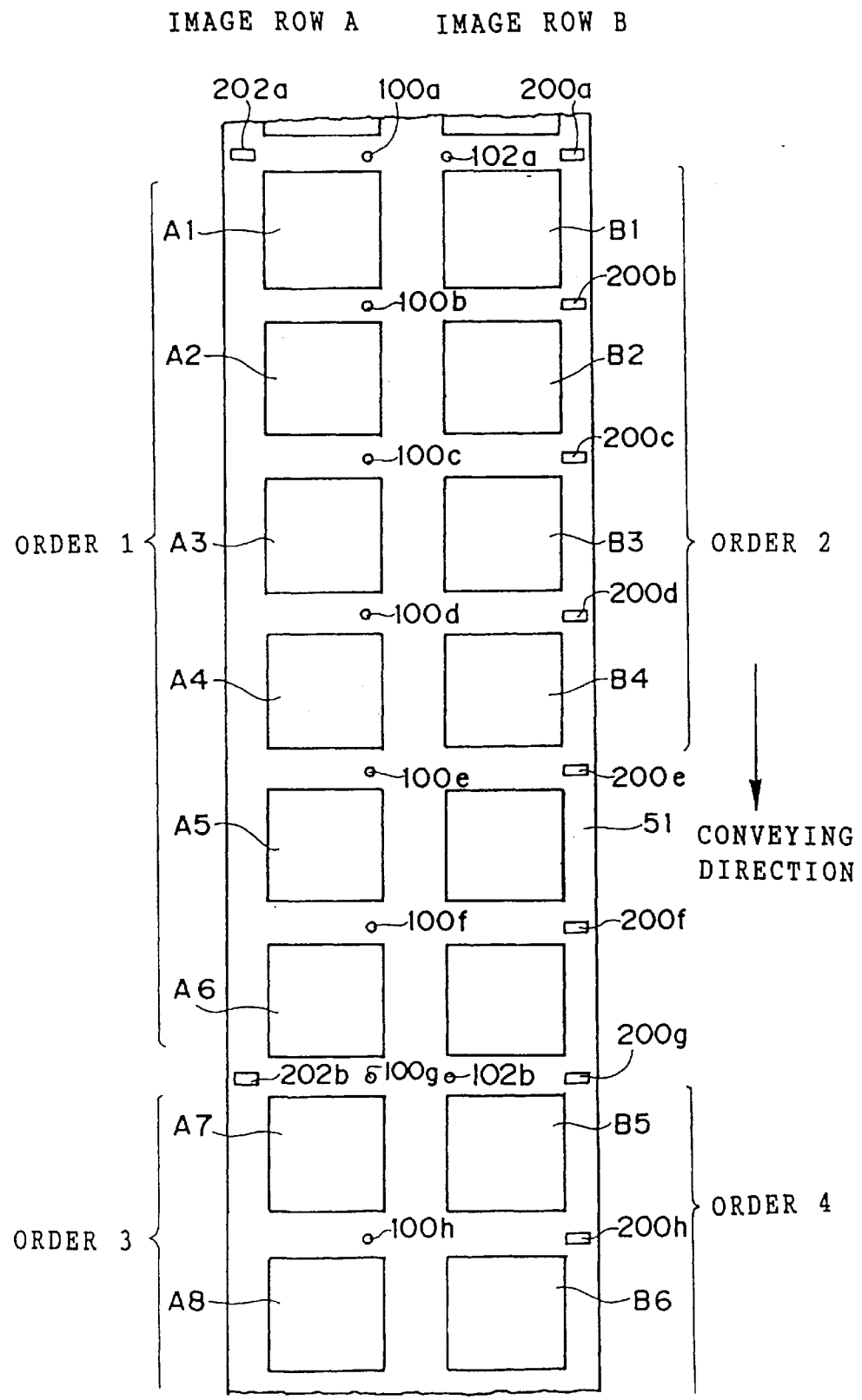
FIG. 8 is a partial explanatory view of another two-row printed photographic paper of the present embodiment.
Figure 9:
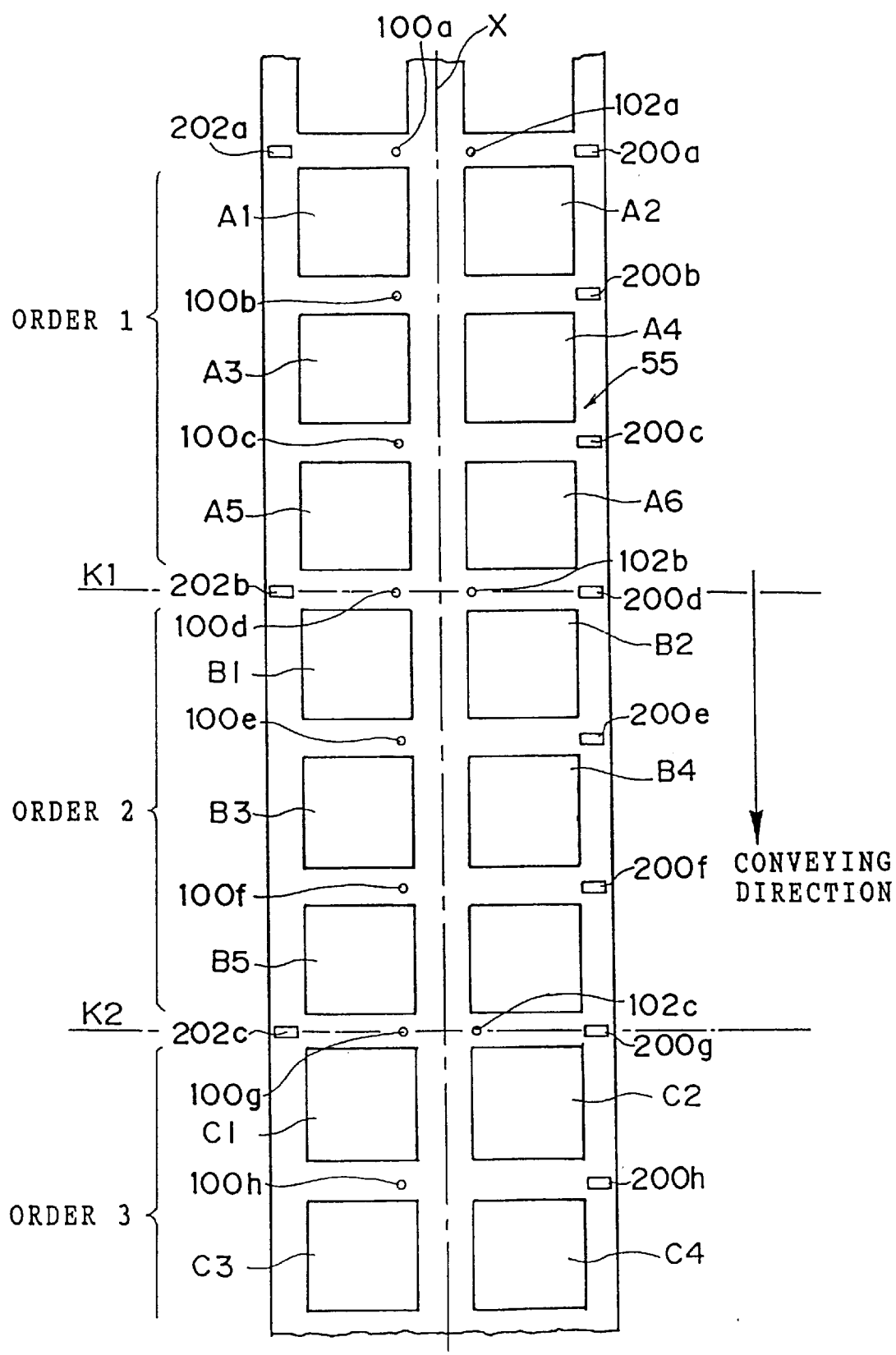
FIG. 9 is a partial explanatory view of another two-row printed photographic paper of the present embodiment.

When a photographic print is manufactured, for example, as is shown in FIG. 8, images of a large number of ordered films may be printed by printing images of films along the longitudinal direction of a photographic printing paper so that images of a film of one order are contained in either row, image row A or image row B. Alternatively, as is shown in FIG. 9, images of a large number of ordered films may be printed by printing images of films of one order on a photographic printing paper over two rows. Subsequently, the two-row printed photographic paper 55 can be obtained by developing the printed photographic printing paper.

The obtained two-row printed photographic paper 55 is separated into each image row by a slitter 70 (see FIG. 5) and then cut into each image forming region so as to obtain photographic prints.

It should be noted in the above two embodiments, the photographic printing paper is made into a two-row printed photographic paper and then cut by the slitter 70 (see FIG. 5). Alternatively, an undeveloped photographic printing paper on which images are printed over two rows can be separated by the slitter 70 (see FIG. 5) into each image row and then developed as one-row photographic prints, which will be subsequently cut into each image forming region.

What is claimed is:

1. A method of manufacturing a postcard-affixed photographic print in which a postcard is bonded to a back surface of the photographic print, comprising steps of:

printing images in a plurality of image rows, each of said image rows having a plurality of images which are formed along a longitudinal direction of an elongated photographic printing paper, wherein said plurality of image rows are formed in a transverse direction of the photographic printing paper on the photographic printing paper;

performing a first punching step on the photographic printing paper before said printing step, to punch first image printing position demarcating holes in the photographic printing paper along a conveying direction of the photographic printing paper, wherein each first image printing position demarcating hole demarcates a printing position of one image, said first punching step further comprising punching first order demarcation indicating holes which each demarcate one order in the photographic printing paper; and performing a second punching step on the photographic printing paper to punch second image printing position demarcating holes in the photographic printing paper along the conveying direction of the photographic printing paper, wherein each second image printing position demarcating holes indicates demarcation of one image, said second punching step further comprises punching second order demarcation indicating holes which each indicate demarcation of one order in the photographic printing paper, wherein, in said printing step, for each first image printing position demarcating hole, images are aligned in a transverse direction of the photographic printing paper, and on the basis of each first order demarcation indicating hole, printing of images of a respective order is performed, and a second punching position at which punching of the second image printing position demarcating holes and the second order demarcation indicating holes is carried out in the second punching step is adjusted such that holes punched during the first punching step and the second punching step are punched at positions corresponding to positions indicating demarcation of images in each row of the plurality of image rows and at position corresponding to positions indicating demarcation of orders in each row of the plurality of image rows.

2. A method of manufacturing a postcard-affixed photographic print as claimed in claim 1, further comprising steps of:

developing images formed on the photographic printing paper so as to form a plural-row printed photographic paper on which a plurality of image rows are formed, each of said image rows including a plurality of images;

bonding together a reverse surface of at least one image formed portion of the plural-row printed photographic paper and a reverse surface of a postcard after superposing the reverse surface of the image formed portion and the reverse surface of the postcard; and cutting the plural-row printed photographic paper along the sides of each postcard after said bonding step.

3. A method of manufacturing a postcard-affixed photographic print as claimed in claim 1, further comprising steps of:

developing images formed on the photographic printing paper so as to form a plural-row printed photographic paper on which a plurality of image rows including a plurality of images are formed;

separating the plural-row printed photographic paper into a plurality of single-row printed photographic papers each including a plurality of images, by cutting the plural-row printed photographic at a region between the image rows formed thereon;

bonding together a reverse surface of at least one image formed portion of at least one of the single-row printed photographic papers and a reverse surface of a postcard after superposing the reverse surface of the image formed portion and the reverse surface of the postcard; and cutting the at least one single-row printed photographic paper along the sides of each postcard after said bonding step, wherein said bonding step is conducted by at least one bonding apparatus for carrying out bonding.

4. A method of manufacturing a postcard-affixed photographic print as claimed in claim 1, wherein two image rows are formed on the photographic printing paper, and in said first punching step and said second punching step, in a first image row of the two image rows, said first punching step comprises punching holes in positions corresponding to positions which each indicate demarcation of one image and said second punching step comprises punching holes in positions corresponding to positions which each indicate demarcation of one order, and in a second image row of the two image rows, said second punching step further comprises punching holes in positions corresponding to positions which each indicate demarcation of one image and said first punching step further comprises punching holes in positions corresponding to positions which each indicate demarcation of one order.

5. A method of manufacturing a postcard-affixed photographic print as claimed in claim 1, further comprising steps of:

separating the photographic printing paper on which the plurality of image rows are formed into a plurality of single row photographic printing papers on which a plurality of images are formed, by cutting the photographic printing paper at a region between the image rows;

developing the single row photographic printing papers to provide single row prints; and bonding together a reverse surface of at least one image formed portion of at least one of the single-row prints and a reverse surface of a postcard after superposing the image formed portion and the postcard; and cutting the at least one single-row print along the sides of each postcard after said bonding step.

6. The method according to claim 1, wherein each second image printing position demarcating hole is aligned in the transverse direction of the photographic printing paper with a respective first image printing position demarcating hole, and each second order demarcation indicating hole is aligned in the transverse direction of the photographic printing paper with a respective first order demarcation indicating hole.

7. The method according to claim 1, wherein in the printing step, images corresponding to a first order are printed across each of the rows of the plurality of images.

8. The method according to claim 1, wherein in the printing step, images corresponding to a first order are printed in one of the rows of the plurality of images and images corresponding to a second order are printed in another one of the rows of the plurality of images, the images of the first order being different from images of the second order.

9. The method according to claim 1, wherein each second order demarcation indicating hole is aligned in the transverse direction of the photographic printing paper with one of the first image printing position demarcation holes, and each first order demarcation indicating hole is aligned in the transverse direction of the photographic printing paper with one of the second image printing position demarcating holes.

10. The method according to claim 1, wherein the second punching position is adjustable in accordance with a predetermined combination of the holes to be punched during the first punching step and the second punching step.

11. The method according to claim 1, wherein the second punching step is performed after said printing step.

12. The method according to claim 7, wherein in said printing step, images corresponding to a second order are printed across each of the rows of the plurality of images, the images corresponding to the first order being different from the images corresponding to the second order.

13. The method according to claim 1, wherein said printing step further comprises printing multiple copies of a first subject image, for each first image printing position demarcating hole, said multiple copies are aligned in a transverse direction of the photographic printing paper and said multiple copies are repeated along the longitudinal direction of the photographic printing paper, and for each first order demarcation indicating hole, printing of images of a second subject image commences.

14. The method of manufacturing a postcard-affixed photographic print as claimed in claim 1, wherein each of the first image printing position demarcating holes is a demarcating hole which demarcates the printing position of one image in a first image row in the plurality of image rows, each of the second image printing position demarcating holes is a demarcating hole which demarcates the printing position of one image in a second image row in the plurality of image rows, each of the first order demarcation indicating holes is a demarcating hole which demarcates one order in the second image row in the plurality of image rows, and each of the second order demarcation indicating holes is a demarcating hole which demarcates one order in the first image row in the plurality of image rows.

15. A postcard-affixed photographic print manufacturing apparatus for manufacturing a postcard-affixed photographic print in which a postcard is bonded to a back surface of the photographic print, comprising:

printing device for printing images in a plurality of image rows, each of said image rows having a plurality of images which are formed along a longitudinal direction of an elongated photographic printing paper, wherein said plurality of image rows are formed in a transverse direction of the photographic printing paper on the photographic printing paper;

a first punching device for punching first image printing position demarcating holes in the photographic printing paper along a conveying direction of the photographic printing paper before images are printed, each of said first image printing position demarcating holes demarcating a printing position of one image, said first punching device further punching first order printing position demarcating holes which each demarcate a printing position of one order; and a second punching device for punching second image printing position demarcating holes in the photographic printing paper along the conveying direction of the photographic printing paper image, each of said second image printing position demarcating holes demarcating one image and said second punching device further punching second order demarcation indicating holes which each indicate demarcation of one order, wherein said printing device, for each first image printing position demarcating hole, prints images which are aligned in a transverse direction of the photographic printing paper, and on the basis of each first order demarcation indicating hole, prints images of a respective order, and a second punching position at which punching the second image printing position demarcating holes and the second order demarcation indicating holes are carried out by said second punching device is adjusted such that holes punched by said first punching device and the second punching device are punched at positions corresponding to positions indicating demarcation of images in each row of the plurality of image rows and at positions corresponding to positions indicating demarcation of orders in each row of the plurality of image rows.

16. A postcard-affixed photographic print manufacturing apparatus as claimed in claim 15, further comprising:

a print forming device for forming a plural-row printed photographic paper on which a plurality of image rows are formed, by developing the photographic printing paper on which the images are printed;

a bonding device for bonding a reverse surface of at least one image formed portion of the plural-row printed photographic paper and a reverse surface of a postcard; and a cutting device for cutting the plural-row printed photographic paper along the sides of each postcard after bonding by said bonding device.

17. A postcard-affixed photographic print manufacturing apparatus as claimed in claim 15, further comprising:

a print forming device for forming a plural-row printed photographic paper on which a plurality of image rows are formed, by developing the photographic printing paper on which the images are printed;

a separating device for separating the plural-row printed photographic paper in single-row printed photographic papers on each of which an image row is formed, by cutting the plural-row printed photographic paper at a region between the image rows formed thereon;

a bonding device for bonding a reverse surface of at least one image formed portion of the single-row photographic papers and a reverse surface of a postcard; and a cutting device for cutting the single-row printed photographic papers along the sides of each postcard after bonding.

18. A postcard-affixed photographic print manufacturing apparatus as claimed in claim 15, wherein two image rows are formed on the photographic printing paper, and by said first punching means and said second punching means, in one image row of the two image rows, said first punching means punches holes in positions corresponding to positions which each indicate demarcation of one image and said second punching means punches holes in positions corresponding to positions which each indicate demarcation of one order, and in another image row of the two image rows, said second punching means punches holes in positions corresponding to positions which each indicate demarcation of one image and said first punching means punches holes in positions corresponding to positions which each indicate demarcation of one order.

19. A postcard-affixed photographic print manufacturing apparatus as claimed in claim 15, further comprising:

- a separating device for separating the photographic printing paper on which the plurality of image rows are formed into a plurality of single row photographic printing papers on which a plurality of images are formed, by cutting the photographic printing paper at a region between the image rows;
- a print forming device for forming at least one single-row printed photographic paper by developing one of the single row photographic printing paper on which a plurality of images are formed; and
- a bonding device for bonding a reverse surface of at least one image formed portion of at least one of the single-row printed photographic paper and a reverse surface of a postcard; and
- a cutting device for cutting the single-row printed photographic paper along the sides of each postcard after bonding.

20. The apparatus of claim 15, wherein each second image printing position demarcating hole is aligned in the transverse direction of the photographic printing paper with a respective first image printing position demarcating hole, and each second order demarcation indicating hole is aligned in the transverse direction of the photographic printing paper with a respective first order demarcation indicating hole.

21. The apparatus of claim 15, wherein said printing device prints images corresponding to one order across each of the rows of the plurality of images.

22. The apparatus of claim 15, wherein said printing device prints images corresponding to a first order in one of the rows of the plurality of images and prints images corresponding to a second order in another one of the rows of the plurality of images, the images of the first order being different from images of the second order.

23. The apparatus of claim 15, wherein each second order demarcation indicating hole is aligned in the transverse direction of the photographic printing paper with one of the first image printing position demarcating holes, and each first order demarcation indicating hole is aligned in the transverse direction of the photographic printing paper with one of the second image printing position demarcating holes.

24. The apparatus according to claim 15, wherein the second punching position is adjustable in accordance with a predetermined combination of the holes to be punched by said first punching device and said second punching device.

25. The apparatus according to claim 15, wherein the second punching device punches holes after images are printed.

26. The apparatus according to claim 15, wherein said printing device, for each first image printing position demarcating hole, prints multiple copies of a first subject image which are aligned in a transverse direction of the photographic printing paper, said multiple copies being are repeated along the longitudinal direction of the photographic printing paper, and for each first order printing position demarcating hole, printing of images of a second subject image commences.

27. The postcard-affixed photographic print manufacturing apparatus as claimed in claim 15, wherein

- each of the first image printing position demarcating holes is a demarcating hole which demarcates the printing position of one image in a first image row in the plurality of image rows,
- each of the second image printing position demarcating holes is a demarcating hole which demarcates the printing position of one image in a second image row in the plurality of image rows,
- each of the first order demarcation indicating holes is a demarcating hole which demarcates one order in the second image row in the plurality of image rows, and
- each of the second order demarcation indicating holes is a demarcating hole which demarcates one order in the first image row in the plurality of image rows.

\* \* \* \* \*